United States Patent [19]

Rifi

[11] Patent Number: 5,126,408

[45] Date of Patent: * Jun. 30, 1992

[54] THERMOPLASTIC OLEFINS

[75] Inventor: Mahmoud R. Rifi, Kendall Park, N.J.

[73] Assignee: Union Carbide Chemicals & Plastics Technology Corporation, Danbury, Conn.

[*] Notice: The portion of the term of this patent subsequent to Mar. 14, 2006 has been disclaimed.

[21] Appl. No.: 490,845

[22] Filed: Mar. 9, 1990

[51] Int. Cl.$^5$ .................. C08L 23/16; C08L 23/12
[52] U.S. Cl. .................. 525/240; 525/211
[58] Field of Search .................. 525/240

[56] References Cited

U.S. PATENT DOCUMENTS

| | | | |
|---|---|---|---|
| 3,887,534 | 6/1975 | Baba et al. | 525/387 |
| 4,812,526 | 3/1989 | Rifi | 525/240 |
| 4,833,195 | 5/1989 | Adur et al. | 525/240 |
| 4,985,502 | 1/1991 | Izumi et al. | 525/240 |

FOREIGN PATENT DOCUMENTS 58-157839 9/1983 Japan .
58-210949 12/1983 Japan .

OTHER PUBLICATIONS

Plastics & Rubber International—"VLDPE—A New Class of Polyethylenes" Apr. 1986 vol. 11, No. 2.
Modern Plastics-Tech. Revolution Reshapes PP Performance-Apr. 1986 pp. 14–15, 21 & 150.

Primary Examiner—Carman J. Seccuro
Attorney, Agent, or Firm—Saul R. Bresch

[57] ABSTRACT

A composition comprising:
  (a) isotactic polypropylene; and
  (b) a copolymer of ethylene and an alpha-olefin having at least 3 carbon atoms and having a density equal to or less than 0.915 gram per cubic centimeter and a molecular weight of at least about 250,000
wherein the ratio of flow indices of component (a) to component (b) is in the range of about 60:1 to about 200:1.

8 Claims, No Drawings

THERMOPLASTIC OLEFINS

TECHNICAL FIELD

This invention relates to a blend of isotactic polypropylene and a copolymer of ethylene and propylene.

BACKGROUND INFORMATION

Blends of isotactic polypropylene with amorphous ethylene/propylene copolymers (EPM) or with ethylene/propylene/diene terpolymers (EPDM) are well known. The EPDM is crosslinked through the diene unsaturation to provide products having good toughness and chemical resistance characteristics. Overall, certain of these blends based on crosslinked EPDM have a good balance of mechanical and chemical properties, which give these products utility in wire and cable, hose, and gasket applications. It has been proposed to substitute amorphous EPM for EPDM because EPM is less expensive; however, attempts to crosslink the EPM with an organic peroxide in the presence of the isotactic polypropylene lead to chain scission of the polypropylene and to the production of thermoplastic olefins with inferior properties.

DISCLOSURE OF THE INVENTION

An object of this invention, therefore, is to provide a blend of isotactic polypropylene and EPM or another copolymer wherein chain scission can be avoided and the resulting blend has properties, which are at least equivalent to commercial blends based on isotactic polypropylene and crosslinked EPDM.

Other objects and advantages will become apparent hereinafter.

According to the present invention, the above object is met by a composition comprising:

(a) isotactic polypropylene; and
(b) a copolymer of ethylene and an alpha-olefin having at least 3 carbon atoms and having a density equal to or less than 0.915 gram per cubic centimeter and a molecular weight of at least about 250,000 wherein the ratio of flow indices of component (a) to component (b) is in the range of about 60:1 to about 200:1.

DESCRIPTION OF THE PREFERRED EMBODIMENT(S)

The isotactic polypropylene is conventional and can be prepared by processes such as the one described in U.S. Pat. No. 4,304,891. The isotactic polypropylene is usually the homopolymer.

The copolymer, i.e., the ethylene/alpha-olefin copolymer, has a molecular weight of at least about 250,000, and preferably has a molecular weight in the range of about 250,000 to about 1,000,000. The flow index of the copolymer can be at least about 0.5 gram per 10 minutes, is preferably in the range of about 0.5 to about 20 grams per 10 minutes, and is most preferably in the range of about 1 to about 10 grams per 10 minutes.

The ratio of flow indices of component (a) to component (b) is in the range of about 60:1 to about 200:1 and is preferably in the range of about 100:1 to about 200:1. The molecular weight or flow index are conventionally controlled during polymerization with a chain terminator such as hydrogen.

The ethylene/alpha-olefin copolymers are usually based on an alpha-olefin having 3 to 8 carbon atoms. They have a density equal to or less than 0.915 gram per cubic centimeter, and preferably no less than 0.850 gram per cubic centimeter. Examples of suitable alpha-olefins are propylene, 1-butene, 1-hexene, 5-methyl-pentene-1, and 1-octene.

A distinction can be made between ethylene/propylene rubber and other ethylene/propylene copolymers having a density equal to or less than 0.915 gram per cubic centimeter. The ethylene/propylene rubber generally has a density of less than 0.870 gram per cubic centimeter and has a lower modulus than the other ethylene/propylene copolymers of higher density.

The ethylene/alpha-olefin copolymers can be prepared using either a titanium or a vanadium based catalyst system.

With respect to the titanium based catalyst system, the respective comonomers are generally contacted with a catalyst system containing a catalyst precursor comprising magnesium, titanium, a halogen, and an electron donor as well as one or more aluminum containing compounds such as triethylaluminum and triisobutylaluminum. A typical titanium based catalyst system and the preparation of the copolymer are described in U.S. Pat. No. 4,302,565.

With regard to the vanadium based catalyst system, the respective comonomers are preferably contacted with a supported catalyst system containing a catalyst precursor comprising a vanadium trihalide, an electron donor, and a hydrocarbyl aluminum halide together with a hydrocarbyl aluminum cocatalyst and a halogen substituted lower alkane promoter, the lower alkane promoter having 1 to 7 carbon atoms. A typical vanadium based catalyst system and a process for preparing the copolymer are described in European Patent Application 0 120 501 published on Oct. 3, 1984.

In the composition, component (a), i.e., the isotactic polypropylene, can be present in an amount of about 20 to about 80 percent by weight based on the combined weight of component (a) and (b) and is preferably present in an amount of about 20 to about 60 percent by weight.

The portion of the copolymer attributed to the alpha-olefin comonomers, in the case where the comonomers are the primary comonomers along with ethylene, can be in the range of about 10 to about 50 percent by weight based on the weight of the copolymer and is preferably in the range of about 15 to about 40 percent by weight. The portion of the copolymer based on ethylene is usually greater than about 60 percent by weight and is preferably more than 70 percent by weight. Where additional comonomers are used to provide a terpolymer or a polymer based on four or more comonomers, the portion based on these comonomers can be in the range of about 1 to about 15 percent by weight.

Conventional additives can be added to the blend of isotactic polypropylene and copolymer of ethylene and alpha-olefin. The amount of additive is usually in the range of about 0.01 to about 50 percent by weight based on the weight of the resin. Useful additives are antioxidants, ultraviolet absorbers, antistatic agents, pigments, dyes, fillers, slip agents, fire retardants, plasticizers, processing aids, lubricants, stabilizers, and smoke inhibitors.

One of the advantages of this invention is that the high molecular weight copolymer, i.e., component (b), acts as if it was crosslinked.

The patents and patent application mentioned in this specification are incorporated by reference herein.

The invention is illustrated by the following examples.

EXAMPLES 1 TO 5

The isotactic polypropylene used in the examples has a melt flow of 3.5; xylene solubles of 3.5 percent; and a flow index of 670 grams per 10 minutes.

The EPM has a density of 0.869 gram per cubic centimeter; a flow index of 4 grams per 10 minutes; and contains 32 percent by weight propylene. The molecular weight is 275,000.

The isotactic polypropylene and the EPM are blended together in a Brabender mixing head by mixing for 20 minutes at 200° C.

The proportions of components in weight percent based on the total weight of the blend and properties of the blend are given in the Table. In example 5, a blend of isotactic polypropylene and a commercial crosslinked EPDM is tested for comparative purposes. The properties of this blend are also given in the Table.

present in an amount of about 40 to about 80 percent by weight based on the combined weight of components (a) and (b).

2. The composition defined in claim 1 wherein the molecular weight of component (b) is in the range of about 250,000 to about 1,000,000.

3. The composition defined in claim 1 wherein the flow index of component (b) is at least about 0.5 gram per 10 minutes.

4. The composition defined in claim 3 wherein the flow index of component (b) is in the range of about 0.5 to about 20 grams per 10 minutes.

5. The composition defined in claim 1 wherein components (a) and (b) are blended together.

6. The composition defined in claim 1 wherein the portion of the component (b) copolymer attributed to the alpha-olefin having at least 3 carbon atoms is in the range of about 10 to about 40 percent by weight based on the weight of the copolymer.

7. The composition defined in claim 1 wherein the alpha-olefin has 3 to 8 carbon atoms.

8. The composition defined in claim 1 wherein com-

|  | Examples | | | | |
| --- | --- | --- | --- | --- | --- |
|  | 1 | 2 | 3 | 4 | 5 |
| Components (weight percent) | | | | | |
| isotactic polypropylene | 85 | 70 | 50 | 30 | 30 |
| EPM | 15 | 30 | 50 | 70 | — |
| EPDM | — | — | — | — | 70 |
| Properties | | | | | |
| Flow Index (g/10 min) | 514 | 330 | 120 | 52 | 260 |
| 1% SFM (psi) | 160,000 | 125,000 | 86,000 | 37,500 | 39,000 |
| tensile strength (psi) | 4150 | 3220 | 2450 | 1840 | 2650 |
| elongation (%) | 215 | — | 440 | 300 | 520 |
| ultimate tension (%) | — | — | 47 | 43 | 44 |
| Notched Izod (ft lbs/in.) | | | | | |
| 0° C. | 0.8 | 2.0 | — | — | — |
| −20° C. | — | 1.3 | — | — | — |
| Gardner Impact (inch lbs) | | | | | |
| −30° C. | 20 | >320 | >320 | — | — |
| Stress Whitening (inch) | 0.5 | 0.4 | 0.0 | 0.0 | 0.3 |

Notes to Table:
1. Flow Index is measured under ASTM D-1238, Condition F, at 230° C. and 440 psi. The results are reported in grams per 10 minutes (g/10 mn).
2. The 1% SFM (Secant Flexural Modulus) test is carried out according to ASTM D-790. The results are reported in pounds per square inch (psi).
3. Tensile strength (psi) and elongation (%) tests are carried out under ASTM 412.
4. The ultimate tension test is carried out under ASTM D-395-85 and the results are reported in percent.
5. The Notched Izod Impact Strength test is carried out at 0° C. and minus 20° C. under ASTM D-256. The results are reported in foot pounds per inch (ft. lbs/in).
6. The Gardner Impact Strength test is carried out at minus 30° C. under ASTM D-3029, Condition G. The results are reported in inch-pounds.
7. The stress whitening resistance test is carried out as follows: An injection molded disk measuring 0.125 by 4 inches is used. The apparatus is the same as for the Gardner Impact Strength test except that the support ring is removed. The sample is impacted at 10 inch-pounds (2 pound weight at height of 5 inches) and allowed to age at room temperature for 24 hours. The average diameter (in inches) of the whiteness (blush) area is referred to as stress whitening. The lower the number, the higher the resistance to stress whitening.

I claim:

1. A composition comprising:
   (a) isotactic polypropylene; and
   (b) an uncrosslinked copolymer of ethylene and an alpha-olefin having at least 3 carbon atoms and having a density equal to or less than 0.915 gram pre cubic centimeter and a molecular weight of at least about 250,000
   wherein the ratio of flow indices of component (a) to component (b) is at least about 100:1; and
      component (a) is present in an amount of about 20 to about 60 percent by weight and component (b) is ponent (b) is produced by contacting the relevant comonomers, under polymerization conditions, with (i) a catalyst system containing a catalyst precursor comprising magnesium, titanium, a halogen, and an electron donor, and one or more aluminum containing compounds or (ii) a catalyst system containing a catalyst precursor comprising a vanadium trihalide, an electron donor, and a hydrocarbyl aluminum halide; a hydrocarbyl aluminum cocatalyst; and a halogen substituted lower alkane promoter.

* * * * *